United States Patent
Hammerschmidt et al.

(10) Patent No.: US 10,866,152 B2
(45) Date of Patent: Dec. 15, 2020

(54) DEVICE AND METHOD FOR TORQUE MEASUREMENT

(71) Applicant: Infineon Technologies AG, Neubiberg (DE)

(72) Inventors: Dirk Hammerschmidt, Finkenstein (AT); Christof Michenthaler, Arnoldstein (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/428,128

(22) Filed: May 31, 2019

(65) Prior Publication Data

US 2019/0376858 A1    Dec. 12, 2019

(30) Foreign Application Priority Data

Jun. 6, 2018  (DE) .......................... 10 2018 113 476

(51) Int. Cl.
*G01L 3/00*    (2006.01)
(52) U.S. Cl.
CPC ..................... *G01L 3/00* (2013.01)
(58) Field of Classification Search
CPC . G01L 3/00; G01L 3/102; G01L 3/101; G01L 3/109; G06F 15/00
USPC .................................................. 73/862.191
See application file for complete search history.

(56) References Cited

U.S. PATENT DOCUMENTS

| | | | |
|---|---|---|---|
| 7,631,564 B1* | 12/2009 | Sihler | G01L 3/102 73/862.333 |
| 8,024,956 B2* | 9/2011 | Hammerschmidt | G01D 5/145 73/1.11 |
| 8,216,147 B2* | 7/2012 | Akiyama | A61B 8/00 600/437 |
| 8,421,446 B2* | 4/2013 | Straubinger | G01D 5/2225 324/207.15 |
| 8,607,650 B2* | 12/2013 | Antoni | G01D 5/2451 73/760 |
| 9,020,774 B2* | 4/2015 | Kishida | G01B 7/30 702/151 |
| 9,026,378 B2* | 5/2015 | Fericean | G01D 5/202 702/41 |

(Continued)

FOREIGN PATENT DOCUMENTS

| | | |
|---|---|---|
| DE | 10039217 A1 | 2/2002 |
| DE | 102006054179 A1 | 5/2008 |

(Continued)

*Primary Examiner* — Octavia Hollington
(74) *Attorney, Agent, or Firm* — Harrity & Harrity, LLP

(57) ABSTRACT

A concept for torque measurement on a shaft is described. To that end, millimeter waves are transmitted in the direction of a first encoder structure, which is coupled to a first shaft section of the shaft for conjoint rotation and is arranged around the shaft, and in the direction of a second encoder structure, which is coupled to a second shaft section of the shaft for conjoint rotation and is arranged around the shaft. The first encoder structure and the second encoder structure are rotatable relative to one another in the case of a torque to be transmitted via the shaft. At least one reception signal is generated on the basis of millimeter waves reflected or transmitted by the first and second encoder structures. A torque transmitted using the shaft is determined on the basis of the at least one reception signal.

20 Claims, 11 Drawing Sheets

(56) References Cited

U.S. PATENT DOCUMENTS

| | | | | |
|---|---|---|---|---|
| 9,897,498 B2* | 2/2018 | Schmid | .................. | G01L 3/109 |
| 10,035,535 B2* | 7/2018 | Ohira | ..................... | G01D 5/244 |
| 2015/0362388 A1* | 12/2015 | Schmid | .................. | G01L 3/109 |
| | | | | 73/862.333 |

FOREIGN PATENT DOCUMENTS

| | | | |
|---|---|---|---|
| DE | 102009038256 A1 | 4/2010 | |
| DE | 102009009714 A1 | 12/2010 | |
| EP | 3290886 A1 | 3/2018 | |

* cited by examiner

FIG. 14

Transmitting millimeter waves in the direction of a first encoder structure, which is coupled to a first shaft section of the shaft for conjoint rotation and is arranged around the shaft, and in the direction of a second encoder structure, which is coupled to a second shaft section of the shaft for conjoint rotation and is arranged around the shaft, wherein the first encoder structure and the second encoder structure are rotatable relative to one another in the case of a torque to be transmitted via the shaft Generating at least one reception signal on the basis of millimeter waves reflected or transmitted by the first and second encoder structures Determining a torque transmitted by the shaft on the basis of the at least one reception signal

DEVICE AND METHOD FOR TORQUE MEASUREMENT

CROSS REFERENCE TO RELATED APPLICATION

This application claims priority under 35 U.S.C. § 119 to German Patent Application No. 102018113476.2 filed on Jun. 6, 2018, the content of which is incorporated by reference herein in its entirety.

TECHNICAL FIELD

Example implementations of the present disclosure relate generally to sensors for detecting rotations and in particular to sensor arrangements for detecting transmitted torques, for detecting rotational speeds and/or for detecting rotation directions.

BACKGROUND

Torque sensors are used for example in mechanical engineering and the automotive industry, such as, for example, torque sensors which can be used in an electrically operated power-assisted steering system of a motor vehicle. Torque sensors may be based on a resistance potentiometer, for example, in which a conventional torque sensor has the form of a potentiometer, wherein one of the two parts of the potentiometer which are movable relative to one another is in each case connected to a respective side of a torsion element situated in the axle that transmits the torque to be measured. A mechanical contact is produced and the contact position of the potentiometer changes. Since the potentiometer and a friction location of a circular ring constantly remain in contact with a fixed wall, the frequent rotation of the potentiometer and of the circular ring leads to abrasion that considerably reduces the lifetime of the sensor. At the same time, the power during operation of the steering device may be deficient on account of the frictional resistance. At the same time, the identification precision of the sensor with regard to the torque of the steering device is also reduced. Moreover, in conventional potentiometer torque sensors, the transition process from the torque to an electrical signal has very many links and also comprises a large number of components, which entails high costs. However, what is disadvantageous, in particular, is that the torque sensor on the rotating shaft has to be electrically supplied and the coiled cable provided for this purpose limits the number of revolutions. Alternatively, a wireless energy supply by inductive coupling, for example, is required, but this considerably increases complexity, structural space and costs. Furthermore, the wireless data transmission has a negative influence on the achievable sampling rate and measurement latency.

A further type of torque sensors uses a magnetic detection for detecting a change in the position. However, owing to the necessity of magnetic pole wheels or ferromagnetic gearwheels and back bias magnets, magnetic field applications may cause additional costs on the application side. In addition, the magnetic field sensors have a considerable leakage field sensitivity particularly if they transmit the magnetic fields from a rotatable part to a stationary part with the measurement electronics.

SUMMARY

There is a need to reduce sensor costs and at the same time to increase the performance in the vehicle, industrial and consumer applications mentioned above.

This need is met by the devices and methods as claimed in the independent claims. The dependent claims relate to developments which are advantageous under some circumstances.

In accordance with a first aspect, a device for torque measurement on a shaft is proposed. The device comprises a first encoder structure, which is coupled to a first shaft section of the shaft for conjoint rotation and is arranged around the shaft, and a second encoder structure, which is coupled to a second shaft section of the shaft for conjoint rotation and is arranged around the shaft. The first and second encoder structures may also be referred to as first and second rotary or angle encoders. The first encoder structure and the second encoder structure are rotatable relative to one another in the case of a torque to be transmitted via the shaft. The device furthermore comprises at least one transmitter configured to transmit millimeter waves (mm waves) in the direction of the first and second encoder structures and at least one receiver configured to receive mm waves reflected or transmitted by the first and second encoder structures, and to generate at least one reception signal. The device additionally comprises a processor configured to determine a torque transmitted by the shaft on the basis of the at least one reception signal.

In general, mm waves are understood to mean microwaves whose wavelengths lie in the millimeter range, that is to say between 1 mm and 10 mm, which corresponds to a frequency band of 30 GHz to 300 GHz. In an extended sense, however, example implementations can also be realized with frequencies of up to a few GHz if future technologies enable effective realizations of systems in this frequency range.

In accordance with some possible implementations, the first encoder structure has first fingers coupled to the first shaft section for conjoint rotation, said first fingers reflecting the mm waves. Correspondingly, the second encoder structure can have second fingers coupled to the second shaft section for conjoint rotation, said second fingers reflecting the mm waves. The first fingers and the second fingers can intermesh and be arranged rotatably relative to one another in a circumferential direction.

In accordance with some possible implementations, the first and second fingers extend along the shaft, e.g. substantially in the direction of the shaft axis.

In accordance with some possible implementations, the first fingers are arranged on a first radius around the shaft, while the second fingers are arranged on a second radius around the shaft. In this case, the two radii can be different, but also identical. Different radii can further improve a differentiation of the first and second fingers and/or the rotation of the two encoder structures relative to one another.

In accordance with some possible implementations, the first fingers have reflectivities that are different than reflectivities of the second fingers. The encoder structures can be differentiated as a result. The reflectivity (also reflectance) is the ratio between reflected and incident intensity as energy variable.

In order to obtain different reflectivities, in accordance with some possible implementations, a geometry of the first fingers is different than a geometry of the second fingers. This is one possible alternative for differentiating the two encoder structures.

In accordance with some possible implementations, the first and second fingers are embodied with different widths and/or have differently curved surfaces. These are geometric alternatives for differentiating the two encoder structures.

In accordance with some possible implementations, radially within the first and second fingers, a cylinder lateral surface having predefined reflection and/or absorption properties for the mm waves is arranged around the shaft. As a result, defined reflection conditions can be created and/or undesired interference signals can be reduced.

In accordance with some possible implementations, a radial distance between the cylinder lateral surface and the first and/or second fingers is an odd multiple of one quarter of the wavelength of the mm waves. Consequently, at the receiver, signals reflected by the cylinder lateral surface appear in a manner phase-shifted by 180° with respect to signals reflected at the encoder structures and can thus easily be identified. Other predefined phase shifts are likewise conceivable, of course.

In accordance with some possible implementations, radially within the first and second fingers, there is arranged a structure that prevents a reflection of mm waves back to the receiver which enter a space within the first and second fingers through gaps between the first and second fingers. Consequently, at the receiver, disturbing reflections can be avoided or at least reduced.

In accordance with some possible implementations, the structure within the first and second fingers is configured to absorb mm waves that have entered. By virtue of this alternative, at the receiver, disturbing reflections can be avoided or at least reduced.

In accordance with some possible implementations, the structure within the first and second fingers is configured to reflect mm waves that have entered in the space within the first and second fingers in such a way that they no longer exit from the space within the first and second fingers. By virtue of this alternative, too, at the receiver, disturbing reflections can be avoided or at least reduced.

In accordance with some possible implementations, the receiver has an antenna array having a plurality of antenna elements. In this case, a first antenna element of the antenna array, in the case of an arbitrary position of the first and second encoder structures has a first angular position between two adjacent fingers of the same encoder structure. A second antenna element, in the case of the position of the first and second encoder structures, has a second angular position between two adjacent fingers of the same encoder structure, which is different than the first angular position. As a result, a resolution can be increased and the rotation direction of the shaft can be identified.

In accordance with some possible implementations, the first encoder structure is embodied structurally identically to the second encoder structure. By way of example, two identically embodied encoder disks arranged offset along the shaft can be involved.

In accordance with some possible implementations, the processor is configured to determine the torque on the basis of an angular offset or rotation angle between a first encoder disk pattern and a second encoder disk pattern. Without torque, the two encoder disk patterns are congruent or offset with respect to one another in a defined manner, e.g. by half a structure size.

In accordance with some possible implementations, the processor is configured to determine from the reception signal an order of the first and second encoder structures, and to determine a rotation direction of the shaft from the order. This can be done for example by evaluation of signal pulses (e.g. pulse duration, amplitude, etc.).

Additionally or alternatively, the processor is configured to determine a rotation angle between first and second encoder structures from the reception signal, and to determine the torque from the rotation angle. This can be done for example by consideration of a distance between a signal pulse assigned to the first encoder structure and a signal pulse assigned to the second encoder structure.

In accordance with some possible implementations, the shaft has, between the first shaft section and the second shaft section, a region having a lower material stiffness than the first and second shaft sections. Particularly in the case of relatively short shafts, it is thus possible to increase a rotation between the shaft sections in the case of a torque to be transmitted. This greater rotation in turn can be better detected.

In accordance with some possible implementations, the region having the lower material stiffness comprises a different material and/or has a smaller diameter than the first and second shaft sections.

In accordance with some possible implementations, the transmitter and/or the receiver comprise(s) at least one flexible waveguide configured to transport the mm waves from or to the first and second encoder structures. Consequently, the mm waves can be transported over greater distances and/or through housings for example from a central transceiver to the encoder structures and back. Furthermore, it is also possible to supply a plurality of transceivers with one and the same local oscillator (LO) signal via waveguides.

In accordance with a further aspect, a method for torque measurement on a shaft is proposed. The method comprises transmitting mm waves in the direction of a first encoder structure, which is coupled to a first shaft section of the shaft for conjoint rotation and is arranged around the shaft, and in the direction of a second encoder structure, which is coupled to a second shaft section of the shaft for conjoint rotation and is arranged around the shaft. In this case, the first encoder structure and the second encoder structure are arranged rotatably relative to one another in the case of a torque to be transmitted via the shaft. At least one reception signal is generated on the basis of mm waves reflected or transmitted by the first and second encoder structures. A torque transmitted by the shaft is determined on the basis of the at least one reception signal.

Example implementations of the present disclosure make it possible, by way of the detection of the relative rotation of the two encoder structures, to determine the torque responsible for this, wherein mm waves are used for ascertaining said relative rotation, said mm waves being emitted and received by a transmitter and a receiver outside the rotating structure.

BRIEF DESCRIPTION OF THE FIGURES

Some examples of devices and/or methods are explained in greater detail merely by way of example below with reference to the accompanying figures, in which:

FIG. 14 shows a method for torque measurement on a shaft.

DESCRIPTION

Various examples will now be described more thoroughly with reference to the accompanying figures, in which some examples are illustrated. In the figures, the thicknesses of lines, layers and/or regions may be exaggerated for elucidation purposes.

While further examples are suitable for various modifications and alternative forms, some specific examples thereof are accordingly shown in the figures and are described thoroughly below. However, this detailed description does not limit further examples to the specific forms described. Further examples can cover all modifications, counterparts and alternatives that fall within the scope of the disclosure. Throughout the description of the figures, identical or similar reference signs refer to identical or similar elements which can be implemented identically or in modified form in a comparison with one another, while they provide the same or a similar function.

It goes without saying that if one element is designated as "connected" or "coupled" to another element, the elements can be connected or coupled directly or via one or more intermediate elements. If two elements A and B are combined using an "or", this should be understood such that all possible combinations are disclosed, i.e. only A, only B, and A and B, unless explicitly or implicitly defined otherwise. An alternative wording for the same combinations is "at least one from A and B" or "A and/or B". The same applies, mutatis mutandis, to combinations of more than two elements.

The terminology used here for describing specific examples is not intended to be limiting for further examples. If a singular form, for example "a, an" and "the", is used and the use of only a single element is defined neither explicitly nor implicitly as obligatory, further examples can also use plural elements in order to implement the same function. If a function is described below as being implemented using a plurality of elements, further examples can implement the same function using a single element or a single processing entity. Furthermore, it goes without saying that the terms "comprises", "comprising", "has" and/or "having" in their usage indicate with greater precision the presence of the specified features, integers, steps, operations, processes, elements, components and/or a group thereof, but do not exclude the presence or the addition of one or more other features, integers, steps, operations, processes, elements, components and/or a group thereof Unless defined otherwise, all terms (including technical and scientific terms) are used here in their customary meaning in the field with which examples are associated.

Figure 1:
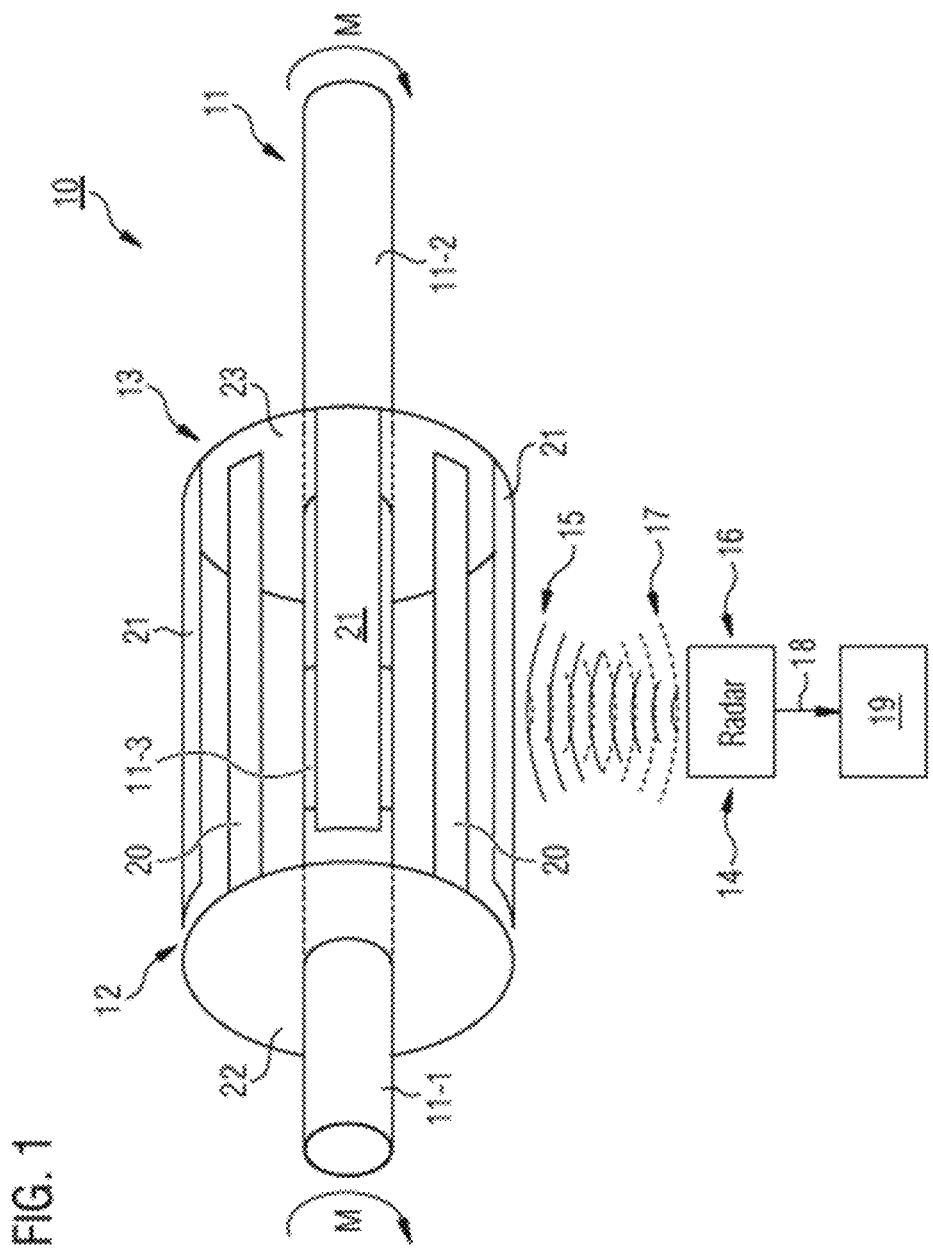
FIG. 1 shows a device for torque measurement on a shaft in accordance with one example implementation.

FIG. 1 shows a schematic illustration of one example implementation of a device 10 for torque measurement on a shaft 11. The device 10 can be used in a wide variety of technical fields in which mechanical shafts play a part. By way of example, it can be used for detecting transmitted torques in motor vehicles. The shaft 11 can thus be a driveshaft, for example. However, the shaft 11 can also be a steering column or any other shaft installed in the motor vehicle.

The device 10 comprises a first encoder structure 12, which is coupled to a first shaft section 11-1 of the shaft 11 for conjoint rotation and is arranged around the shaft 11. The device 10 furthermore comprises a second encoder structure 13, which is coupled to a second shaft section 11-2 of the shaft 11 for conjoint rotation and is arranged around the shaft 11. The first encoder structure 12 and the second encoder structure 13 may also be referred to as first and second rotary or angle encoders.

The first shaft section 11-1 can act for example as input side and the second shaft section 11-2 as output side (or vice versa) for a torque M to be transmitted via the shaft 11. In the case of a difference between the torques present at the input side and the output side, input side and output side of the shaft 11 rotate relative to one another. Accordingly, the first encoder structure 12 and the second encoder structure 13 are embodied rotatably relative to one another in the case of a torque to be transmitted via the shaft 11.

Optionally, the shaft 11 can have, between the first shaft section 11-1 and the second shaft section 11-2, a region 11-3 having a lower material stiffness than the first and second shaft sections 11-1 and 11-2. The region 11-3 is also referred to hereinafter as torque element. Particularly in the case of relatively short shafts, it is thus possible to increase a rotation between the shaft sections 11-1 and 11-2 in the case of a torque M to be transmitted. This greater rotation in turn can be better detected. The region 11-3 having the lower material stiffness can comprise a different material and/or have a smaller diameter than the first and second shaft sections 11-1 and 11-2.

The device 10 furthermore comprises at least one transmitter 14 configured to transmit mm waves 15 in a frequency range of 30 GHz to 300 GHz in the direction of the first and second encoder structures 12, 13. The transmitter 14 is accordingly a radio-frequency (RF) transmitter. In some example implementations, the transmitter 14 transmits non-modulated signals having a carrier frequency in the range mentioned above. Furthermore, provision is also made of at least one receiver 16 configured—depending on the implementation—to receive mm waves 17 reflected or transmitted by the first and second encoder structures 12, 13, and to generate at least one reception signal 18. The receiver 16 is accordingly an RF receiver. In the example implementation depicted schematically in FIG. 1, the mm waves 15 are reflected from the encoder structure 12, 13 to the receiver 16. However, provision could likewise be made of encoder structures which allow the mm waves to pass in order then to receive the mm waves allowed to pass.

The device 10 additionally comprises a processor 19 configured to determine the torque M transmitted by the shaft 11 on the basis of the at least one reception signal 18. To that end, the processor 19 can be configured for analog and/or digital signal processing.

As is illustrated in FIG. 1, it is possible, particularly in the case of reflective encoder structures, to combine transmitter 14 and receiver 16 to form a transceiver 14, 16 in a housing—similar to a radar transceiver. For transmitting and receiving the mm waves, transmitter 14 and receiver 16 comprise corresponding antennas or antenna arrays (not illustrated). Optionally, between the transmitter and/or the receiver and the antenna arrangements, radio-frequency multiplexers can be used in order to be able to produce different transmission and reception configurations with a reduced number of antennas, transmitters and receivers.

As will also be explained below, the encoder structures 12, 13 may be subject to a few possible geometries. One aspect, however, is that the first encoder structure 12 and the second encoder structure 13 are rotatable relative to one another as a result of the torque to be transmitted, and that this rotation can be detected as a result of the mm waves reflected or transmitted differently by the different encoder structures.

In the case of the implementation shown in FIG. 1, the first encoder structure 12 has first reflective fingers 20 coupled to the first shaft section 11-1 for conjoint rotation and arranged at regular distances around the shaft 11. The second encoder structure 13 has second reflective fingers 21 coupled to the second shaft section 11-2 for conjoint rotation and arranged at regular distances around the shaft 11. The first fingers 20 and the second fingers 21 intermesh intermittently and are arranged rotatably relative to one another. A first finger 20 is thus arranged between two adjacent second fingers 21, and a second finger 21 is arranged between two adjacent first fingers 20. The first and second fingers 20, 21 serve as reflector strips for the mm waves 15. Accordingly, they can be fabricated from a material which reflects mm waves well, such as e.g. a metal.

In the example implementation shown, the first fingers 20 are coupled to the first shaft section 11-1 for conjoint rotation via a first disk 22. The second fingers 21 are coupled to the second shaft section 11-2 for conjoint rotation via a second disk 23. The first and second disks 22, 23 extend from the shaft 11 in each case radially outward and carry the fingers 20, 21 on their respective outer circumferences, said fingers extending from there substantially parallel to the shaft 11. However, it is also possible to use spokes or other shaft connection structures instead of the disks. In the example implementation shown, the first fingers 20 extend from the first shaft section 11-1 or the first disk 22 in the direction toward the second shaft section 11-2 or the second disk 23. The second fingers 21 extend from the second shaft section 11-2 or the second disk 23 in the direction toward the first shaft section 11-1 or the first disk. In the example implementation shown, the fingers 20, 21 extend in each case parallel to the shaft axis. It goes without saying that other geometries for the disks 22, 23 and fingers 20, 21 would also be possible.

For the mm wave receiver 16, the first and second fingers 20, 21 can be made differentiable from one another in various ways. To that end, the first fingers 20 should have a reflection behavior that is different than a reflection behavior of the second fingers 21. As a result, the encoder structures 12, 13 can then be differentiated by the processor 19, as a result of which in turn rotation direction and torque identification are then made possible. One measure for achieving different reflection behaviors is, for example, an asymmetrical pattern of the structure. One possibility is, for example, to provide the first fingers 20 with a different geometry than the second fingers 21, such that the respective reflections of the mm waves appear differently at the receiver 16. In the example implementation shown in FIG. 1, the first fingers 20 are embodied as thinner than the second fingers 21 in a circumferential direction. That would, of course, likewise be possible the other way around. A description is given further below of even further alternative or additional design measures for making the first fingers 20 differentiable from the second fingers 21 or the signal reflections thereof.

In accordance with FIG. 1, therefore, use is made of reflective fingers 20, 21 having an interleaved comb structure which surrounds or is arranged circumferentially around the shaft 11 with an optional torque element 11-3 in the center. The torque element 11-3 is dimensioned in a manner such that the reflective fingers 20, 21, which are connected to the shaft on both sides of the torque element 11-3, can rotate relative to one another. An mm wave receiver 16 monitors the position of the fingers 20, 21 in the overlap region of the finger or comb structure. This makes it possible to monitor the rotational speed by detecting the edges of the fingers 20, 21 passing through and at the same time to monitor the torque, wherein the length of the gaps between the fingers 20, 21 connected to different sides of the torque element 11-3 is evaluated. Since two adjacent gaps increase and decrease in opposite directions, the difference or the ratio of two adjacent gap lengths should yield a stable torque figure.

Figure 2:
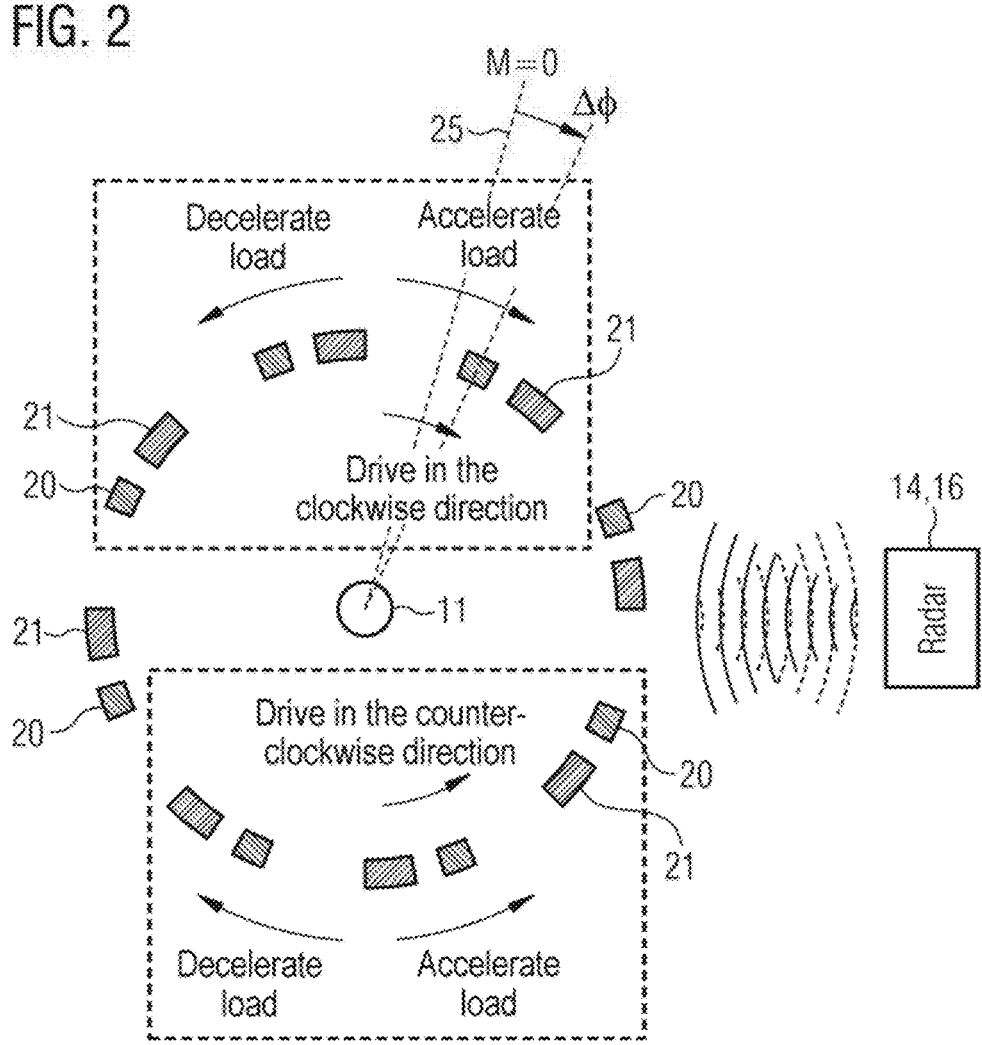
FIG. 2 shows a front view of reflector fingers rotated relative to one another.

In the load-free state, that is to say without torque present, an angular distance between a first and a second finger 20, 21 in a circumferential direction is $\phi$. These ratios change, however, as soon as a torque M is intended to be transmitted via the shaft 11. Assume that a torque in the clockwise direction acts on the input side 11-1 of the shaft 11. The first fingers 20 then rotate relative to the second fingers 21 in the clockwise direction by an angle $\Delta\phi$, that is to say that a first finger 20 moves closer by $\Delta\phi$ to a second finger 21 following it as viewed in the clockwise direction, while it moves further away by $\Delta\phi$ from a second finger 21 that is adjacent as viewed in the counterclockwise direction. This is clearly illustrated in FIG. 2.

If the shaft 11 is excited in the clockwise direction on the input side, with respect to a load-free (M=0) initial position 25, the first fingers 20 rotate by $\Delta\phi$ toward the second fingers 21 following them as viewed in the clockwise direction. To put it another way, with respect to the load-free (M=0) initial position 25, the first fingers 20 rotate by $\Delta\phi$ away from the preceding second fingers 21 as viewed in the clockwise direction. If the shaft 11 is rotated in the counterclockwise direction on the input side, the opposite situation is correspondingly manifested. Similar considerations apply to output-side excitations of the shaft 11.

The changing distances between the first and second intermittent fingers 20, 21 (as viewed in a circumferential direction) as a result of an acting torque M can be detected by the receiver 16 as a result of the reflected mm waves 17. That in turn allows conclusions to be drawn about torque M and/or rotation direction. The processor 19 is thus configured to determine an order of the first and second encoder structures 12, 13 from the reception signal 18, and to determine a rotation direction of the shaft 11 from the order. This can be done for example by evaluation of signal pulses (e.g. pulse duration, amplitude, etc.). Furthermore, the processor 19 is configured directly or indirectly to determine a rotation angle $\Delta\phi$ between first and second encoder structures 12, 13 from the reception signal 18 and to determine the torque M from the rotation angle $\Delta\phi$. This can be done for example by consideration of a distance between a signal pulse assigned to the first encoder structure 12 and a signal pulse assigned to the second encoder structure 13.

Figure 3:
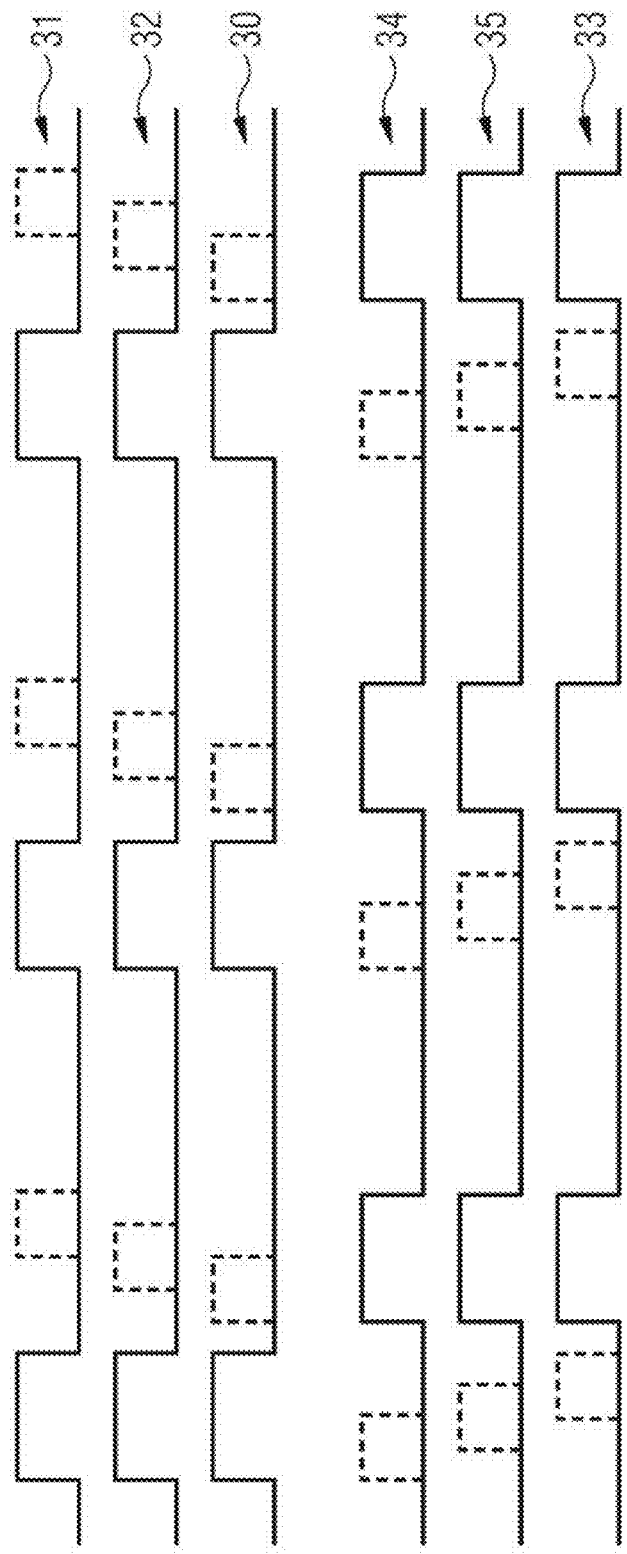
FIG. 3 shows different pulse sequences of correspondingly different scenarios.

FIG. 3 shows example sequences of such signal pulses for different scenarios.

Sequence 30 corresponds to an input-side acceleration of the shaft 11 (with output-side load) in the case of rotation in the clockwise direction. That has the effect that the first fingers 20 move toward succeeding second fingers 21—as viewed in the clockwise direction in a circumferential direction—and the gap between second and first fingers 21, 20 rotating past the transceiver 14, 16 in the clockwise direction thus becomes smaller. On the other hand, the first fingers 20 move away from succeeding second fingers 21 in the counterclockwise direction—the gap between first and second fingers 20, 21 rotating past the transceiver 14, 16 in the clockwise direction thus becomes larger.

Sequence 31 corresponds to an input-side deceleration of the shaft 11 (with output-side load) in the case of rotation in the clockwise direction. That then has the effect that the first fingers 20 move away from succeeding second fingers 21 in the clockwise direction—the gap between second and first fingers 21, 20 rotating past the transceiver 14, 16 in the clockwise direction thus becomes larger. On the other hand, the first fingers 20 move toward succeeding second fingers 21 in the counterclockwise direction—the gap between first and second fingers 20, 21 rotating past the transceiver 14, 16 in the clockwise direction thus becomes smaller.

Sequence 32 corresponds to a constant rotation of the shaft 11 in the clockwise direction. The gaps between the fingers 20, 21 lie between those of the sequences 30 and 31.

If the distance between a long pulse (wide second finger 21) and a subsequent short pulse (thin first finger 20) is thus smaller than the distance between the short pulse and a subsequent long pulse, a rotation direction in the clockwise direction can be deduced. The distance between the long pulse and the subsequent short pulse serves for determining the currently acting torque.

The sequences 33 to 35 describe similar situations in the case of rotation of the shaft 11 in the counterclockwise direction. Sequence 33 describes an input-side acceleration of the shaft 11 in the clockwise direction (with output-side load), sequence 34 describes an input-side deceleration of the shaft 11 in the case of rotation in the clockwise direction (with output-side load), and sequence 35 corresponds to a constant rotation of the shaft 11 in the counterclockwise direction (with output-side load). The gaps between the fingers 20, 21 lie between those of the sequences 33 and 34.

If the distance between a short pulse (thin first finger 20) and a subsequent long pulse (wide second finger 21) is thus smaller than the distance between the long pulse and a subsequent short pulse, a rotation direction in the counterclockwise direction can be deduced. The distance between the short pulse and the subsequent long pulse serves for determining the currently acting torque.

Figure 4:
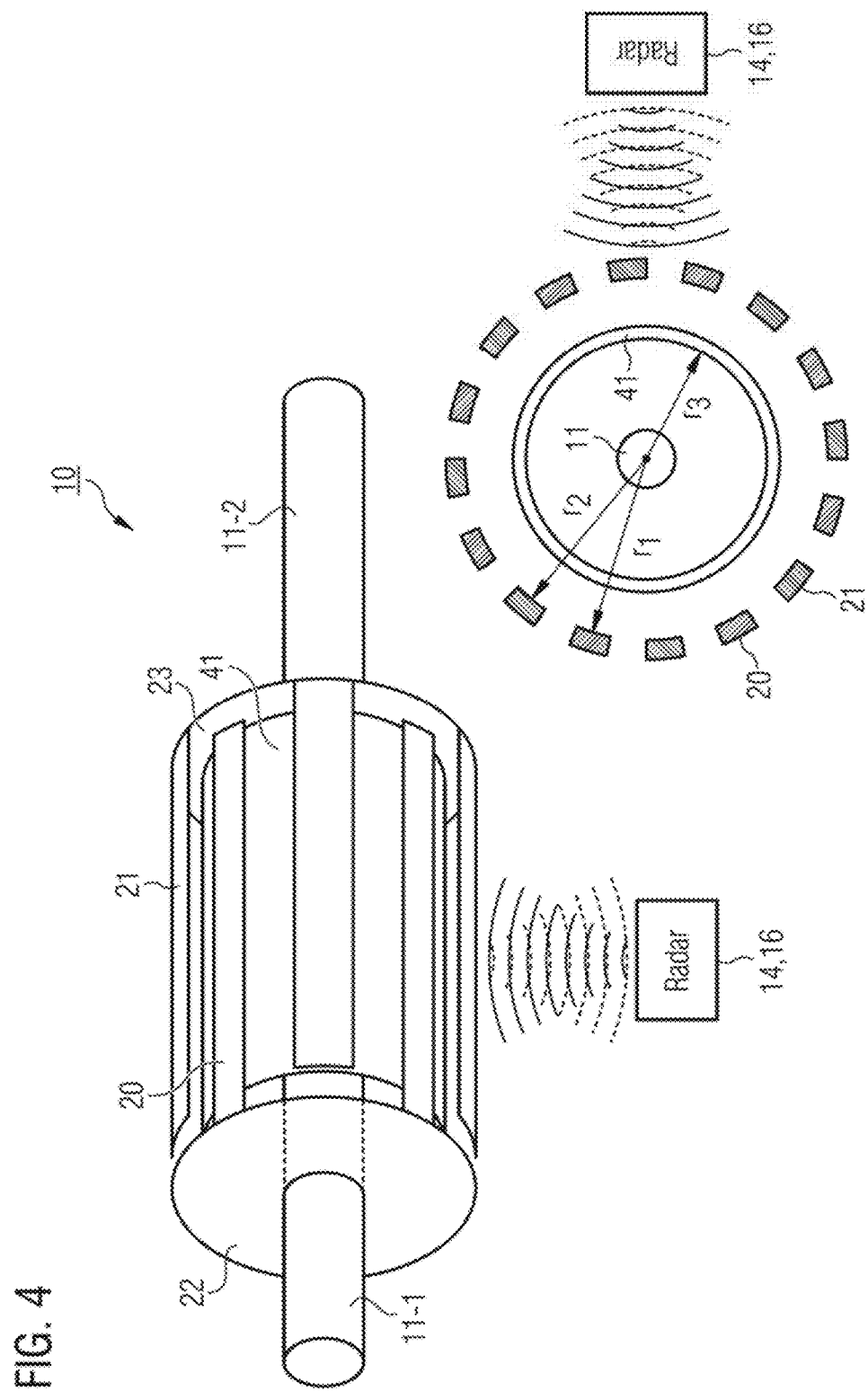
FIG. 4 shows a device for torque measurement on a shaft in accordance with a further example implementation.

FIG. 4 then shows a further possible implementation of the device 10, wherein, in addition, radially within the first and second fingers 20, 21, a cylinder 41 having a lateral surface having predefined reflection or absorption properties for the mm waves 15 is arranged around the shaft 11. The inner cylinder 41 makes it possible to create defined reflection or absorption conditions for the mm waves 15.

The inner cylinder 41 can thus be arranged behind the fingers 20, 21 around the shaft 11. To that end, it can be secured for example to one of the two radially outwardly extending disks 22 or 23 for conjoint rotation and extend along the shaft axis. In accordance with some example implementations, the inner cylinder 41 can be fabricated from a material that reflects mm waves. In such cases, a distance between the cylinder lateral surface and the first and/or second reflector strips 20, 21 is preferably an odd multiple of one quarter of the wavelength of the mm waves. Consequently, at the receiver 16, signals reflected by the cylinder lateral surface appear in a manner phase-shifted by 180° with respect to signals reflected by the reflector strips 20, 21 and can thus be identified and correspondingly processed or filtered out by the processor 19. Other predefined phase shifts are likewise conceivable, of course.

Alternatively, the inner cylinder 41 could also be fabricated from a material that absorbs mm waves, such as, for example, a Salisbury screen, magnetic absorbers, a Dallenbach layer, a circuit analog RAM, etc. In this case, the distance between the cylinder lateral surface and the fingers 20, 21 is of no or only secondary importance.

Figure 5:
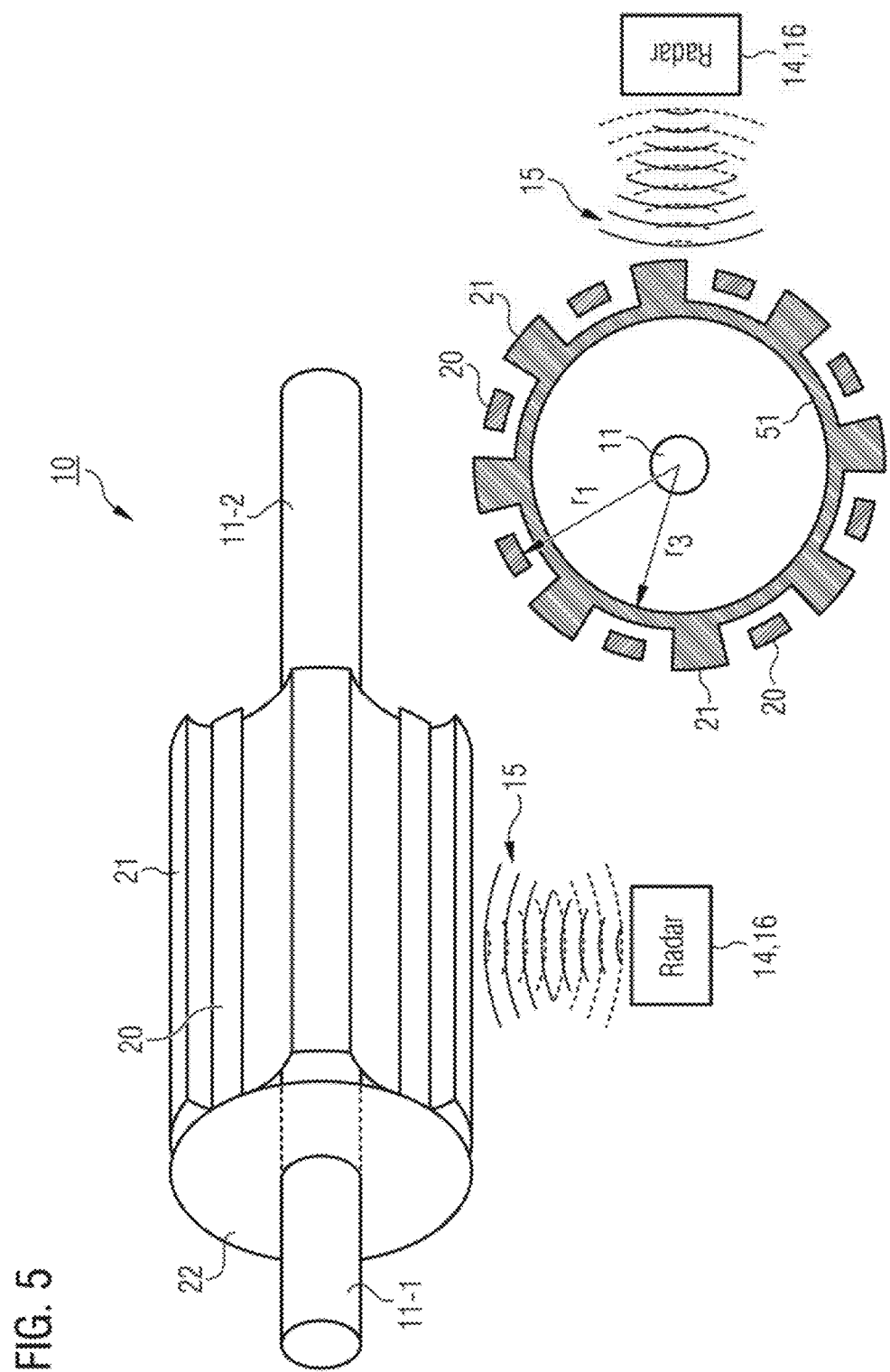
FIG. 5 shows a device for torque measurement on a shaft in accordance with a further example implementation.

FIG. 5 shows a further possible implementation of the device 10, wherein the second fingers 21 are shaped as surface structures of a reflective cylinder lateral surface 51. The cylinder lateral surface 51 together with the fingers 21 projecting radially outward relative thereto is coupled to the disk 23 for conjoint rotation. The radius $r_3$ of the cylinder lateral surface 51 is smaller than the radius $r_1$ of the first fingers 20, such that the latter can be arranged in gaps between the second fingers 21. Such a configuration in accordance with FIG. 5 can also create defined reflection conditions for the mm waves 15 since no mm waves can penetrate into the space within the fingers 20, 21. FIG. 5 thus concerns a structure which generates defined reflection conditions by virtue of the fact that it closes the reflection layer of the structure which is secured to a side of the shaft 11 behind the part secured to the shaft 11 on the other side of the optional torque element 11-3.

Figure 6:
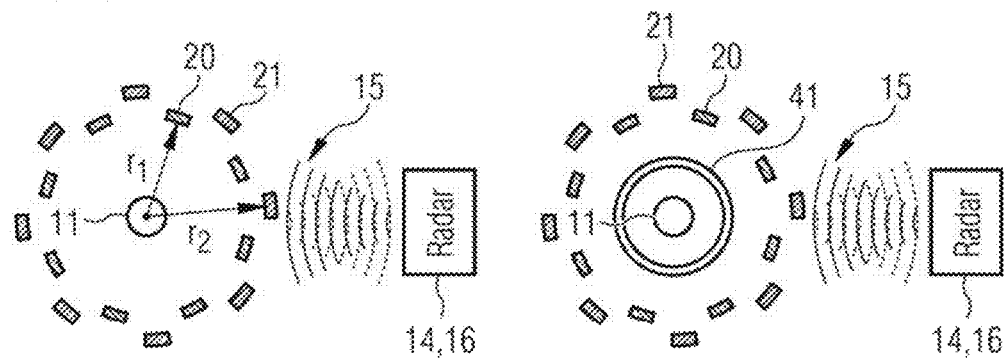
FIG. 6 shows a device for torque measurement on a shaft in accordance with a further example implementation.

FIG. 6 shows two further possible variants of the device 10. Illustrated on the left is an implementation in which the first fingers 20 are arranged around the shaft 11 at a first radius $r_1$, while the second fingers 21 are arranged around the shaft 11 at a different second radius $r_2$. In the example shown, the first radius $r_1$ is smaller than the second radius $r_2$. Consequently, the first fingers 20 are somewhat further away from the transceiver 14, 16 than the second fingers 21, which in turn has the effect that the mm waves 17 reflected back from the first fingers 20 turn out to be weaker at the receiver 16 than those from the second fingers 21. The signal pulses of the different fingers 20, 21 can thus be differentiated here by the amplitude thereof. Different finger widths (as in FIG. 1) are not necessary here, but optionally possible. In the case of the implementation on the right in FIG. 6, the implementation illustrated on the left was combined with the inner cylinder 41 from FIG. 4 in order either to prevent a reflection of mm waves entering the space within the first and second fingers through gaps between the first and second fingers 20, 21 back to the receiver 16 using absorption, or at least to control it using controlled reflection (e.g. using a defined distance with respect to the fingers 20, 21).

Figure 7:
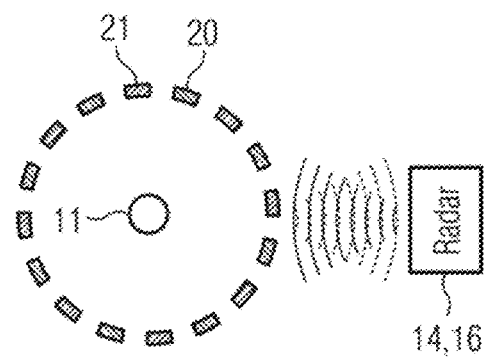
FIG. 7 shows a device for torque measurement on a shaft in accordance with a further example implementation.

FIG. 7 concerns structures in which the two rings of reflective fingers 20, 21 have different reflection properties (e.g. convex & concave), which generate a different characteristic of the reflected mm waves and enable a differentiation between the two rings. In the case of the implementation shown in FIG. 7, the first and second fingers 20, 21 have differently curved surfaces in order to make them differentiable for the receiver 16. While the radially outwardly facing surface of the first fingers 20 is embodied in a concave fashion and thus reflects the mm waves in a concentrated manner in the direction of the receiver 16, the radially outwardly facing surface of the second fingers 21 is embodied in a convex fashion. As a result, the mm waves are reflected from the second fingers 21 only partly to the receiver 16. That has the effect that the reflections originating from the first fingers 20 turn out to be stronger at the receiver 16 than those from the second fingers 21. The signal pulses can thus be differentiated here by their amplitude. Different finger widths (as in FIG. 1) are not necessary here, but optionally possible.

Reflections of different strengths could, of course, additionally or alternatively also be achieved using different materials of the first and second fingers 20, 21.

Figure 8:
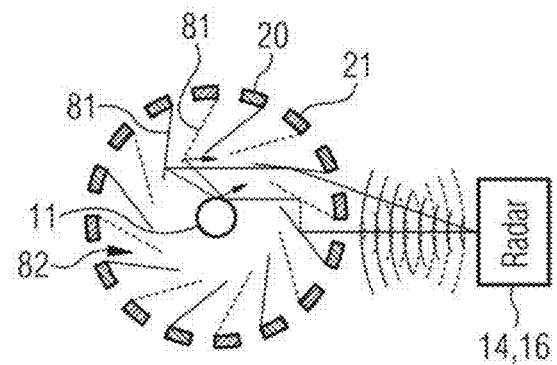
FIG. 8 shows a device for torque measurement on a shaft in accordance with a further example implementation.

FIG. 8 illustrates an implementation in which, within the first and second fingers 20, 21, there is arranged a structure 81 that prevents a reflection of mm waves back to the receiver 16 which enter the space 82 within the first and second fingers 20, 21 through gaps between the first and second fingers 20, 21. The structure 81 in the interior of the rings of reflective fingers thus directs beams (mm waves) passing through the gaps in a direction that does not lead back to the radar receiver 14, 16, unless the energy is negligible on account of losses on the long reflection path. Consequently, at the receiver, disturbing reflections can be avoided or at least reduced. In this example implementation, the structure 81 provides first reflectors fitted to the first fingers 20 and pointing obliquely into the space 82. Second reflectors fitted to the second fingers 20 and pointing obliquely into the space 82 are likewise provided. The reflectors are fitted in such a way that mm waves can indeed enter the space 82 from outside, but cannot exit again, but rather are repeatedly reflected back into the space 82.

Figure 9:
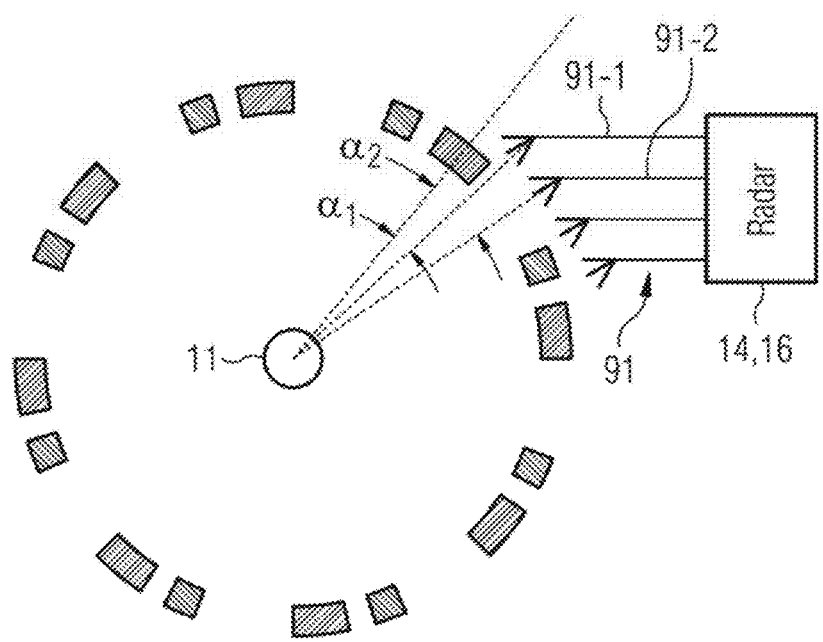
FIG. 9 shows a device for torque measurement on a shaft with an antenna array.
Figure 10:
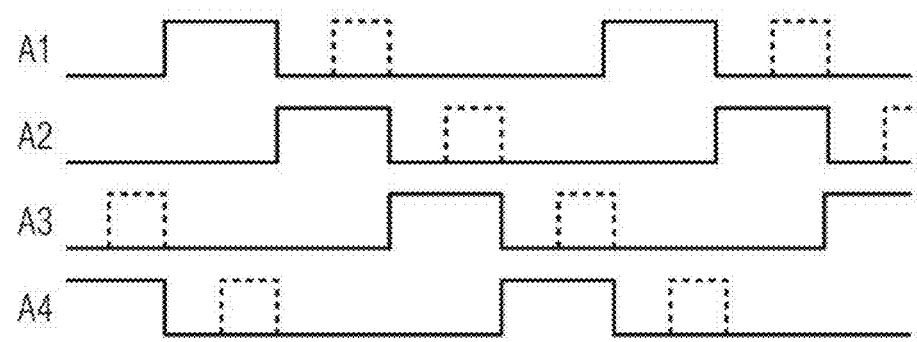
FIG. 10 shows different pulse sequences of correspondingly different scenarios.

FIG. 9 shows an example implementation similar to FIG. 1, but with an antenna array 91 at the transceiver 14, 16. In this case, a first antenna element 91-1 of the antenna array 91, in the case of an arbitrary position of the first and second encoder structures 12, 13, has a first angular position a1 between two adjacent fingers of the same encoder structure (e.g. between two adjacent second fingers 21). A second antenna element 91-2, in the case of the same position of the first and second encoder structures, has a second angular position $\alpha_2$ between two adjacent fingers of the same encoder structure (e.g. between two adjacent second fingers 21), which is different than the first angular position $\alpha_1$, e.g. $\alpha_1 \neq \alpha_2$. As a result, a resolution can be increased and the rotation direction of the shaft 11 can also be identified. Although the antenna elements in FIG. 9 are all arranged between two adjacent first or second fingers 20, 21 (e.g. within the encoder pitch), the antenna elements could also be distributed differently over the circumference. However, care should be taken to ensure that different antenna elements do not "see" the respective closest first or second finger from the same angle. It is thus also possible to use a plurality of antennas (e.g. a patch antenna array) which subdivide the encoder pattern by generating a plurality of phase-shifted reception signals (see FIG. 10) in order to increase the encoder resolution. In this case, the distance between two adjacent antennas is ideally the encoder pattern spacing divided by the number of antennas.

Further example implementations with different encoder structures will now be discussed with reference to FIGS. 11-13.

Figure 11:
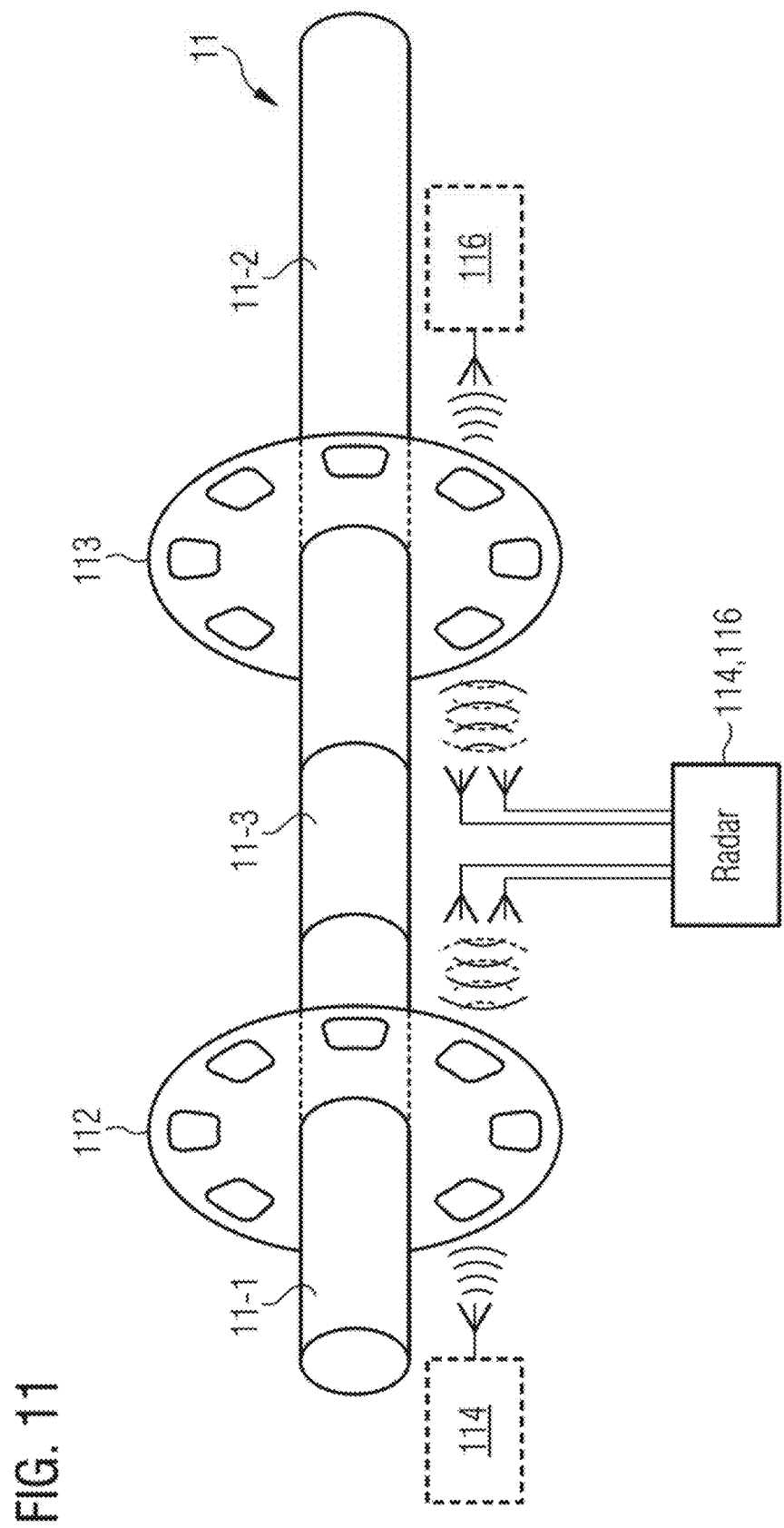
FIG. 11 shows a device for torque measurement on a shaft with two encoder disks in accordance with a further example implementation.

FIG. 11 shows a device 110 for torque measurement on a shaft 11, comprising a first encoder structure 112 coupled to the first shaft section 11-1 for conjoint rotation and having predefined regions of different reflectivity for mm waves and a second encoder structure 113 coupled to the second shaft section 11-2 for conjoint rotation and having predefined regions of different reflectivity for mm waves. In the example shown, the first and second encoder structures 112, 113 are identically embodied encoder disks spaced apart along the shaft 11 and having regions of different reflectivity for mm waves which are distributed uniformly over the circumference of said encoder disks. Other geometries are likewise possible, of course. In the same way as in the example implementations discussed above, the first encoder structure 112 and the second encoder structure 113 are rotatable relative to one another in the case of a torque to be transmitted via the shaft 11.

In the example implementation shown in FIG. 11, each encoder structure 112, 113 is respectively assigned a dedicated mm wave transmitter 114 and mm wave receiver 116. However, it would also be conceivable to manage just with one transmitter and receiver, for example if a transmission of the mm waves through both encoder structures 112, 113 is evaluated rather than the respective signal reflections. This is indicated by dashed lines in FIG. 11. By this means, too, a relative rotation of the two encoder disks 112, 113 and thus a torque could be identified.

In the load-free state, that is to say without torque present, the two encoder disks 112, 113 or their regions of different reflectivity are congruent, such that a first reception signal from the first encoder disk 112 and a second reception signal from the second encoder disk 113 have a synchronous profile. These relations change, however, as soon as a torque M is intended to be transmitted via the shaft 11. Assume that a torque in the clockwise direction acts on the input side 11-1 of the shaft 11. The first encoder disk 112 then rotates relative to the second encoder disk 113 by an angle $\Delta\phi$ in the clockwise direction. That leads to phase shifts between the first reception signal from the first encoder disk 112 and the second reception signal from the second encoder disk 113. The processor 19, which is not explicitly illustrated in FIG. 11, can thus be configured to determine the torque on the basis of a phase or angular offset between a first reception signal from the first encoder disk 112 and a second reception signal from the second encoder disk 113. In the case, too, of example implementations which are based on transmission of the mm waves by both encoder disks 112, 113, the torque can be determined from the signal waveform of the reception pulses.

If the transmission through the two disks 112, 113 were measured, it would also be expedient for the disks 112, 113 not to be congruent, but rather to overlap by 50%, for example, in a load-free fashion. The overlapping opening then becomes larger in one torque direction and smaller in the other direction. For a transmission measurement, it may additionally be advantageous if the disks 112, 113 are as close to one another as is mechanically possible. This would necessitate holding arms from at least one side of the torque element in order to bridge the length of the torque element.

The implementation in FIG. 11 can simplify the mechanism somewhat by comparison with the previous example implementations. On the other hand, the radar system requires an additional channel in order to observe the two encoder disks 112, 113 situated on both sides of the torque element 11-3. A further option that is shown in this case is the detection of the rotation direction using a second antenna arranged at a distance which should be smaller than the encoder distance. In this case, it is possible to derive the direction as a result of the phase shift between the two detection signals. It should be mentioned that this phase comparison can be carried out on the detected pattern signal and should not be confused with the phase monopulse radar, which requires an antenna distance of less than half the wavelength in order to satisfy the sampling theorem. Nevertheless, the phase monopulse or amplitude monopulse principles are additional options which would allow the rotation direction to be detected as well, but the outlay for their implementation would be higher than that for the phase comparison of the two extracted rotational speed signals. In this case, the identification of the signal from the left and right sides of the shaft 11 is carried out via the separate radar channel anyway.

In accordance with some possible implementations, the transmitter 114 and/or the receiver 116 comprise(s) at least one flexible waveguide configured to transport the mm waves from or to the first and second encoder structures 112, 113. That is attractive for the transmission measurement, for example. There would be a central radar IC and, since the two disks 112, 113 are close to one another, the signals can easily be brought to both sides of the pair of disks using one or two short waveguides.

Figure 12:
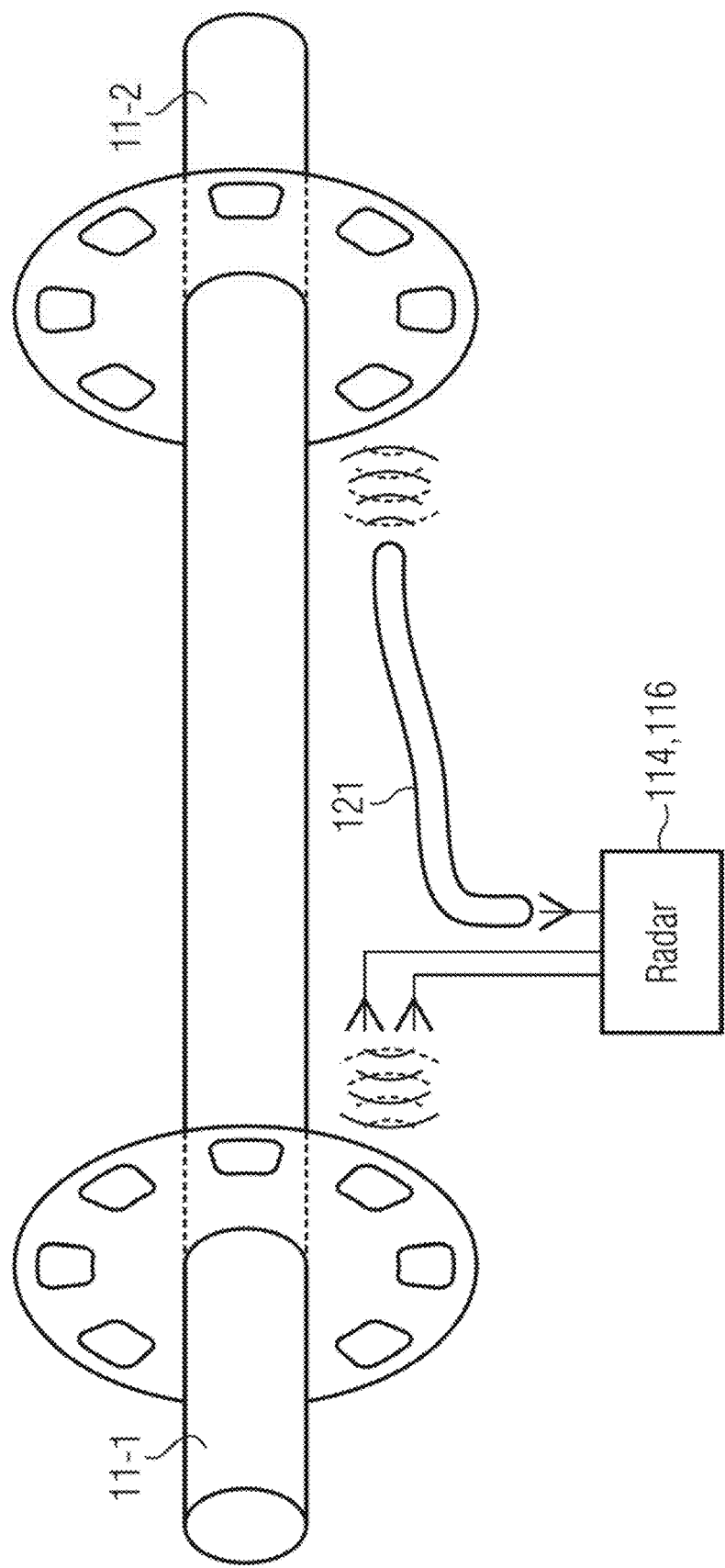
FIG. 12 shows a device for torque measurement on a shaft with two encoder disks in accordance with a further example implementation.
Figure 13:
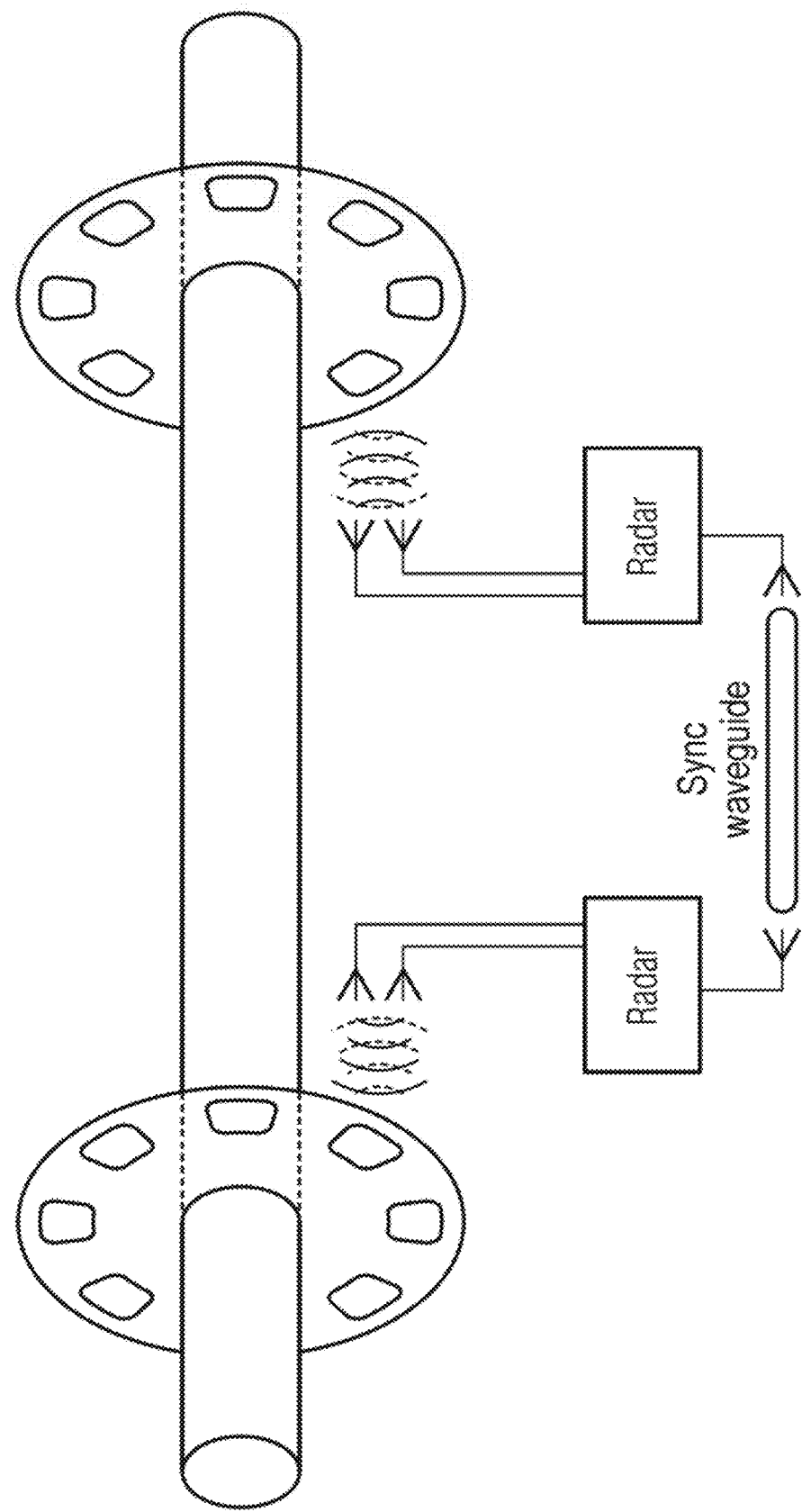
FIG. 13 shows a device for torque measurement on a shaft with two encoder disks in accordance with a further example implementation.

FIG. 12 illustrates an example implementation in which the mm waves are transported back and forth between a radar IC 114, 116 and the second encoder disk 113 via a flexible waveguide 121. This may be advantageous if the shaft 11 is comparatively long and the distance between the two encoder disks 112 and 113 is thus rather large. The relatively large distance can then be bridged using the flexible waveguide 121. The waveguides can be, for example, flexible plastic fiber waveguides or hollow waveguides. The mm waves can thus be transported over relatively large distances and/or through housings for example from a central transceiver to the encoder structures and back.

With the use of waveguides in systems that use a phase comparison between transmission signal and reception signal, it is possible to compute the phase shift as a result of the propagation time in the waveguide in the evaluation and, if appropriate, also to carry out temperature compensation of the linear expansion.

Furthermore, it is also possible to supply a plurality of transceivers with one and the same local oscillator (LO) signal via waveguides. Two radar systems situated directly at the respective encoder disk positions can thus be synchronized via a waveguide that uses the same carrier frequency. Such an example implementation is shown in FIG. 13.

Using the devices described above, it is possible to carry out a method for torque measurement on a shaft. A schematic flow diagram of such a method is shown in FIG. 14.

The method 140 comprises transmitting 142 mm waves in the direction of a first encoder structure 12, 112, which is coupled to a first shaft section 11-1 of the shaft 11 for conjoint rotation and is arranged around the shaft 11, and in the direction of a second encoder structure 13, 113, which is coupled to a second shaft section 11-2 of the shaft 11 for conjoint rotation and is arranged around the shaft 11. In this case, the first encoder structure and the second encoder structure are arranged rotatably relative to one another in the case of a torque to be transmitted via the shaft. At least one reception signal is generated on the basis of mm waves reflected or transmitted by the first and second encoder structures (reference sign 144). A torque transmitted by the shaft 11 is thereupon determined on the basis of the at least one reception signal (reference sign 146).

To summarize, example implementations of the present disclosure propose monitoring two encoder structures mounted on a rotating shaft, said encoder structures being displaced or rotating relative to one another in the event of torque being applied, by a radar detector outside the shaft. The encoder structures or rotary encoders are constructed such that both the rotation direction and the magnitude and direction of the applied torque can be resolved.

The aspects and features that have been described together with one or more of the examples and figures described in detail above can also be combined with one or more of the other examples in order to replace an identical feature of the other example or in order additionally to introduce the feature into the other example.

The description and drawings present only the principles of the disclosure. Furthermore, all examples mentioned here are intended to be used expressly only for illustrative purposes, in principle, in order to assist the reader in understanding the principles of the disclosure and the concepts contributed by the inventor(s) for further development of the art. All statements herein regarding principles, aspects and examples of the disclosure and also concrete examples thereof encompass the counterparts thereof.

A function block designated as "means for . . . " carrying out a specific function can relate to a circuit configured for carrying out a specific function. Consequently, a "means for something" can be implemented as a "means configured for or suitable for something", for example a component or a circuit configured for or suitable for the respective task.

Functions of different elements shown in the figures including those function blocks designated as "means", "means for providing a signal", "means for generating a signal", etc. can be implemented in the form of dedicated hardware, e.g. "a signal provider", "a signal processing unit", "a processor", "a controller" etc. and as hardware capable of executing software in conjunction with associated software. When provided by a processor, the functions can be provided by a single dedicated processor, by a single jointly used processor or by a plurality of individual processors, some or all of which can be used jointly. However, the term "processor" or "controller" is far from being limited to hardware capable exclusively of executing software, but rather can encompass digital signal processor hardware (DSP hardware), network processor, application specific integrated circuit (ASIC), field programmable gate array (FPGA), read only memory (ROM) for storing software, random access memory (RAM) and nonvolatile memory device (storage). Other hardware, conventional and/or customized, can also be included.

A block diagram can illustrate for example a rough circuit diagram which implements the principles of the disclosure. In a similar manner, a flow diagram, a flow chart, a state transition diagram, a pseudo-code and the like can represent various processes, operations or steps which are represented for example substantially in a computer-readable medium and are thus performed by a computer or processor, regardless of whether such a computer or processor is explicitly shown. Methods disclosed in the description or in the patent claims can be implemented by a component having a means for performing each of the respective steps of said methods.

It goes without saying that the disclosure of a plurality of steps, processes, operations or functions disclosed in the description or the claims should not be interpreted as being in the specific order, unless this is explicitly or implicitly indicated otherwise, for example for technical reasons. The disclosure of a plurality of steps or functions therefore does not limit them to a specific order unless said steps or functions are not interchangeable for technical reasons. Furthermore, in some examples, an individual step, function, process or operation can include a plurality of partial steps, functions, processes or operations and/or be subdivided into them. Such partial steps can be included and be part of the disclosure of said individual step, provided that they are not explicitly excluded.

Furthermore, the claims that follow are hereby incorporated in the detailed description, where each claim can be representative of a separate example by itself. While each claim can be representative of a separate example by itself, it should be taken into consideration that—although a dependent claim can refer in the claims to a specific combination with one or more other claims—other examples can also encompass a combination of the dependent claim with the subject matter of any other dependent or independent claim. Such combinations are explicitly proposed here, provided that no indication is given that a specific combination is not intended. Furthermore, features of a claim are also intended to be included for any other independent claim, even if this claim is not made directly dependent on the independent claim.

What is claimed is:

1. A device for torque measurement on a shaft, comprising:
   a first encoder structure coupled to a first shaft section of the shaft for conjoint rotation and arranged around the shaft;
   a second encoder structure coupled to a second shaft section of the shaft for conjoint rotation and arranged around the shaft;
      wherein the first encoder structure and the second encoder structure are rotatable relative to one another in a case of a torque to be transmitted via the shaft;
   at least one transmitter configured to transmit millimeter waves in a direction towards the first encoder structure and the second encoder structure;
   at least one receiver configured to:
      receive the millimeter waves reflected by the first encoder structure and the second encoder structure or other millimeter waves allowed to pass by the first encoder structure and the second encoder structure, generate at least one reception signal; and
   a processor configured to determine the torque transmitted by the shaft based on the at least one reception signal.

2. The device as claimed in claim 1, wherein the first encoder structure has first fingers coupled to the first shaft section for conjoint rotation and arranged around the shaft, wherein the second encoder structure has second fingers coupled to the second shaft section for conjoint rotation and arranged around the shaft, and wherein the first fingers and the second fingers intermesh and are arranged rotatably relative to one another.

3. The device as claimed in claim 2, wherein the first fingers have reflectivity for the millimeter waves which are different than reflectivity of the second fingers.

4. The device as claimed in claim 2, wherein a geometry of the first fingers is different than a geometry of the second fingers.

5. The device as claimed in claim 4, wherein the first fingers and the second fingers are embodied with different widths and/or have differently curved surfaces.

6. The device as claimed in claim 2, wherein the first fingers are arranged on a first radius around the shaft and the second fingers are arranged on a second radius around the shaft, and wherein the first radius is different than the second radius.

7. The device as claimed in claim 2, wherein, within the first fingers and the second fingers arranged around the shaft, a cylinder lateral surface having predefined reflection properties for the millimeter waves is arranged around the shaft.

8. The device as claimed in claim 7, wherein a radial distance between the cylinder lateral surface and the first fingers and/or the second fingers is an odd multiple of one quarter of a wavelength of the millimeter waves.

9. The device as claimed in claim 2, wherein, within the first fingers and the second fingers arranged around the shaft, there is arranged a structure that prevents a reflection of millimeter waves back to the at least one receiver and enables non-reflected millimeter waves to enter a space within the first fingers and the second fingers through gaps between the first fingers and the second fingers.

10. The device as claimed in claim 9, wherein the structure is configured to absorb millimeter waves that have entered the space.

11. The device as claimed in claim 9, wherein the structure is configured to reflect millimeter waves that have entered the space within the first fingers and the second fingers in such a way that the reflected millimeter waves no longer exit from the space within the first fingers and the second fingers.

12. The device as claimed in claim 2, wherein the at least one receiver has an antenna array having a plurality of antenna elements,
   wherein a first antenna element of the antenna array, in a case of a position of the first encoder structure and the second encoder structure, has a first angular position between two adjacent fingers of a same encoder structure, and
   wherein a second antenna element of the antenna array, in the case of the position of the first encoder structure and the second encoder structure, has a second angular position between two adjacent fingers of a same encoder structure,
      the second angular position being different than the first angular position.

13. The device as claimed in claim 1, wherein the first encoder structure is embodied identically to the second encoder structure.

14. The device as claimed in claim 1, wherein the first encoder structure comprises a first encoder disk and the second encoder structure comprises a second encoder disk embodied identically to the first encoder disk, wherein the first encoder disk and the second encoder disk are arranged at a distance along the shaft and each comprises predefined regions of different reflectivity for the millimeter waves.

15. The device as claimed in claim 1, wherein the processor is configured to determine from the at least one reception signal an order of the first encoder structure and the second encoder structure rotating past the at least one receiver, and to determine a rotation direction of the shaft from the order.

16. The device as claimed in claim 1, wherein the processor is configured to determine a rotation angle between the first encoder structure and the second encoder structure from the at least one reception signal, and to determine the torque from the rotation angle.

17. The device as claimed in claim 1, wherein the shaft has, between the first shaft section and the second shaft section, a region having a lower material stiffness than the first shaft section and the second shaft section.

18. The device as claimed in claim 17, wherein the region having the lower material stiffness comprises a different material and/or has a smaller diameter than the first shaft section and the second shaft section.

19. The device as claimed in claim 1, wherein the at least one transmitter and/or the at least one receiver comprise at least one flexible waveguide configured to transport the millimeter waves from or to the first encoder structure or the second encoder structure.

20. A method for torque measurement on a shaft, comprising:
   transmitting millimeter waves in a direction towards a first encoder structure and a second encoder structure, wherein the first encoder structure is coupled to a first shaft section of the shaft for conjoint rotation and is arranged around the shaft, wherein the second encoder structure is coupled to a second shaft section of the shaft for conjoint rotation and is arranged around the shaft, and wherein the first encoder structure and the second encoder structure are rotatable relative to one another in a case of a torque to be transmitted via the shaft;

generating at least one reception signal based on millimeter waves reflected or transmitted by the first encoder structure and the second encoder structure; and determining the torque transmitted by the shaft based on the at least one reception signal.

* * * * *